United States Patent
Wilensky (10) Patent No.: US 6,628,295 B2
(45) Date of Patent: Sep. 30, 2003

(54) MODIFYING A STYLISTIC PROPERTY OF A VECTOR-BASED PATH

(75) Inventor: Gregg D. Wilensky, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 344 days.

(21) Appl. No.: 09/775,166

(22) Filed: Jan. 31, 2001

(65) Prior Publication Data

US 2002/0130908 A1 Sep. 19, 2002

(51) Int. Cl.⁷ .............................................. G06T 11/60
(52) U.S. Cl. ...................... 345/594; 345/650; 345/661; 345/676; 345/863
(58) Field of Search ........................ 345/594, 650–654, 345/661–665, 676–680, 863, 441–443, 473, 474, 475

(56) References Cited

U.S. PATENT DOCUMENTS

| | | | | |
|---|---|---|---|---|
| 5,412,770 A | * | 5/1995 | Yamashita et al. | 345/442 |
| 5,929,867 A | * | 7/1999 | Herbstman et al. | 345/474 |
| 6,208,355 B1 | * | 3/2001 | Schuster | 345/442 |
| 6,340,981 B1 | * | 1/2002 | Graham et al. | 345/863 |
| 2002/0015054 A1 | * | 2/2002 | Hibino | 345/677 |

FOREIGN PATENT DOCUMENTS

EP    0 953 944    3/1999

* cited by examiner

Primary Examiner—Jeffery Brier
(74) Attorney, Agent, or Firm—Fish & Richardson P.C.

(57) ABSTRACT

Methods and apparatus, including computer program products, implementing and using techniques for locally modifying a stylistic property of at least one path in an electronic document. All or a portion of an electronic document and at least one brush tool is displayed to a user. The electronic document has paths defined by parametric vector curves, and the brush tool is indicated by a cursor and having a region of influence. A user input selecting a brush tool and positioning the selected brush tool on the electronic document is received and a stylistic property of paths that pass within the region of influence of the selected brush tool is changed in response to a continuous user-controlled gesture of the brush tool. The stylistic property is a vector-based appearance property that varies along a path. Methods and apparatus, including computer program products, for editing a digital movie is also described.

50 Claims, 3 Drawing Sheets

MODIFYING A STYLISTIC PROPERTY OF A VECTOR-BASED PATH

BACKGROUND

This invention relates to editing of digital images. Modern graphics application programs, such as the Adobe Photoshop® program, produced by Adobe Systems Incorporated of San Jose, Calif., allow a user to paint portions of a digital image. This is usually accomplished with various types of brush-like or pen-like painting tools, which allow a user to create intuitively a modification of the digital image in a local neighborhood of the brush or pen. Tools of this type are usually raster-based and operate on raster images, that is, the tools apply paint by changing the color of a digital image on a pixel-by-pixel basis. Raster-based tools provide a natural and intuitive painting metaphor for modifying an image, but the painting that is made by raster-based tools is resolution dependent. When a raster painted image is at high magnification it will appear jagged and lose detail.

In contrast to raster-based painting tools, there are also vector-based painting tools. Vector-based painting tools apply changes to a digital image based on a mathematical model and are resolution-independent. Consequently, edges look smooth even when the digital image is magnified. Furthermore, in graphics applications that allow manipulations of moving objects, such as the Adobe AfterEffects® application, the objects are normally represented by vectors. If an object in such an application needs to be modified, the modification has to be performed using a vector-based tool. An example of a set of vector-based tools can be found in the Adobe Illustrator® application, in which a Smooth tool can modify entire paint strokes applied with a Paint tool or a Pencil tool. In addition, a large range of styles can be applied to each paint stroke, strokes can be created with arbitrary variation in radius along a curve, and the overall opacity of the strokes can be changed.

Another example of a vector-based painting tool has been described in U.S. patent application Ser. No. 09/056,567, now U.S. Pat. No. 6,208,355, filed on Apr. 7, 1998, for Sketch Based Editing Of Curves. This vector-based painting tool is used to correct undesirable bumps and flat portions that occur in curves that have been drawn with freehand gestures in an electronic document using input devices such as a mouse or graphics tablet. The tool allows a user to replace the bumps and flat portions with smooth curves by using a "sketch-like" movement of the input device to create a replacement curve. The bumps or flat portions are then removed and replaced with the smooth replacement curve segments. The process is comparable to when an artist is drawing with pen and paper and modifies a curve by drawing another line or curve in an area that is undesirable, covering the undesirable portion.

However, this process can only be used to change the shape of a curve and cannot be used to change the color or any other appearance properties of a path. Most users experience conventional vector-based painting tools to be much less intuitive to use than raster-based tools. In addition, vector-based tools lack some of the flexibility of raster-based tools.

SUMMARY

The present invention provides tools and methods for creating and editing paths in electronic documents. In this context, a path is an element of electronic artwork that is based on a one dimensional curve—which may be defined in one or more segments—that defines a shape or trajectory of the path. In addition to its shape, a path can have one or more stylistic properties, such as color or radius, that can be constant or variable along its length. A path has two or more vertices that are connected by path segments. Two of these vertices are endpoints of the path.

In general, in one aspect, the invention provides methods and apparatus, including computer program products, implementing and using techniques for locally modifying a stylistic property of at least one path in an electronic document. In this aspect all or a portion of an electronic document and at least one brush tool is displayed to a user. The electronic document has paths defined by parametric vector curves, and the brush tool is indicated by a cursor and having a region of influence. A user input selecting a brush tool and positioning the selected brush tool on the electronic document is received and a stylistic property of paths that pass within the region of influence of the selected brush tool is changed in response to a continuous user-controlled gesture of the brush tool. The stylistic property is a vector-based appearance property that varies along a path.

Advantageous implementations can include one or more of the following features. The region of influence can be a changeable parameter of the brush tool. The size, the shape, the rotation, and the strength of the region of influence can be changeable. The parametric vector curves can be curves in a two-dimensional space. The parametric vector curves can be represented by polynomials. The parametric vector curves can be Bezier curves. The stylistic property can be changed by altering the vectors that represent the stylistic property. The change of the stylistic property can be a localized change and only affect the parts of the paths that pass within the region of influence of the selected brush tool. The stylistic property of the path can be changed by an amount that is proportional to the distance the selected brush tool is moved during the continuous user-controlled movement of the brush tool. The stylistic property can be described by a polynomial and the components of the vectors associated with the stylistic property can correspond to coefficients in the polynomial. The polynomial can be a cubic polynomial and each polynomial coefficient can have an associated stiffness coefficient. The stylistic property may be a property unrelated to the shape of the path and can for example be the width of the path, the opacity of a stroke of the path, or a color property of a fill of the path. The color property can, for example, be the luminosity, the hue, or the saturation of the fill of the path. The stylistic property can be instances of a pattern that are stamped along the path. Changing a stylistic property may, for example, comprise locally rotating, locally translating, locally scaling, or locally distorting one or more instances of the pattern. Changing a stylistic property may comprises changing a stylistic property only for the path in the electronic document that at any given moment passes closest to a center of the region of influence of the selected brush tool.

In general, in another aspect, the invention provides methods and apparatus, including computer program products, implementing and using techniques for locally modifying a stylistic property of at least one path in an electronic document. In this aspect at least a part of the electronic document with the at least one path is displayed to a user. Each path is defined by a parametric vector curve and has at least one stylistic property. The stylistic property is a vector-based appearance property that varies along the path. User inputs selecting a location in the electronic document, a region of influence around the location, and a stylistic property to be modified are received, and the selected stylistic property of paths that lie within the region of influence is locally modified by altering the vectors associated with the stylistic property.

Advantageous implementations can include one or more of the following features. A user input indicating the degree of localization and extent of the modification of the stylistic property can be received. Each path may be delimited by two vertices. One or more vertices can be added to divide the path into smaller path segments, where each path segment is defined by a smaller parametric vector curve and having at least one vector-based stylistic property. The stylistic property of path segments within the region of influence can be locally modified by altering the vectors associated with the stylistic property. The selected stylistic property can be modified based on an amplification factor associated with the path.

In general, in another aspect, the invention provides methods and apparatus, including computer program products, implementing and using techniques for locally modifying a stylistic property of at least one path in an electronic document. In this aspect all or a portion of an electronic document and at least one brush tool is displayed to a user. The electronic document has paths defined by polynomials, and the brush tool is indicated by a cursor and has a region of influence. A user input selecting a brush tool and positioning the selected brush tool on the electronic document is received vectors that are associated with at least one path that passes within the region of influence of the selected brush tool are altered in response to a user-controlled gesture of the brush tool. The vectors represent a width of the at least one path that varies along the at least one path.

In general, in another aspect, the invention provides methods and apparatus, including computer program products, implementing and using techniques for locally modifying a stylistic property of at least one path in an electronic document. In this aspect all or a portion of an electronic document and at least one brush tool is displayed to a user. The electronic document has paths that are defined by parametric vector curves, and the brush tool is indicated by a cursor and has a region of influence. A user input selecting a brush tool and positioning the selected brush tool on the electronic document is received and an appearance property is locally changed for parts of the paths that pass within the region of influence of the selected brush tool in response to the distance that the brush tool is moved during a continuous user-controlled gesture. The appearance property is a vector-based property that is unrelated to the shape of a path and varies along the path.

Advantageous implementations can include one or more of the following features. The appearance property may, for example, be the width of the path, the opacity of a stroke of the path, or a color property of a fill of the path.

In general, in another aspect, the invention provides methods and apparatus, including computer program products, implementing and using techniques for editing a digital movie that has a first keyframe, a second keyframe, and intermediate frames. In this aspect the first keyframe and at least one brush tool is displayed to a user. The first keyframe has paths defined by a parametric vector curves, and the brush tool is indicated by a cursor and having a region of influence. A first user input selecting a brush tool and using the brush tool to change a stylistic property of paths in the first keyframe that pass within the region of influence of the selected brush tool is received. The stylistic property is a vector-based appearance property that varies along a path. The second keyframe and the selected brush tool is displayed to the user. The second keyframe has paths defined by parametric vector curves corresponding to the paths in the first keyframe. A second user input using the selected brush tool to change the stylistic property of paths in the second keyframe that pass within the region of influence of the selected brush tool is received. A change of the stylistic property for paths in intermediate keyframes corresponding to the changed paths in the first and second keyframes is automatically interpolated.

The invention can be implemented to include one or more of the following advantages. Paths in a digital image can be dynamically painted and edited using brush-like tools while maintaining a vector model of the path and its attributes. Examples of such brush tools include a radius-changing brush that thickens or thins the brush strokes in a local neighborhood of the brush, an opacity-changing brush that increases or decreases the brush stroke opacities in the local neighborhood, and a color-changing brush that locally changes the brush stroke colors. The user can change the local neighborhood, or region of influence, of the brush. The selected brush can affect all the paths that lie within the radius of influence of a brush. The same brush tool can affect different paths differently. The user can also control the degree of localization for the changes, that is, how large are the sections of the paths that are affected by a given brush tool movement. These advantages, by themselves or in combination, give the user great flexibility and add new ways of editing vector-based paths in digital images. The brush tools also provide a more intuitive way of modifying vector-based paths than conventional vector-based tools do.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The following detailed description will refer to a single vector-based path and a single stylistic parameter by way of example. The principles apply readily to multiple vector-based paths and multiple stylistic parameters. First a conceptual explanation of the principles of a process for modifying a path in accordance with the invention will be given. Then a more mathematical description detailing the computations involved will be presented.

Figure 1:
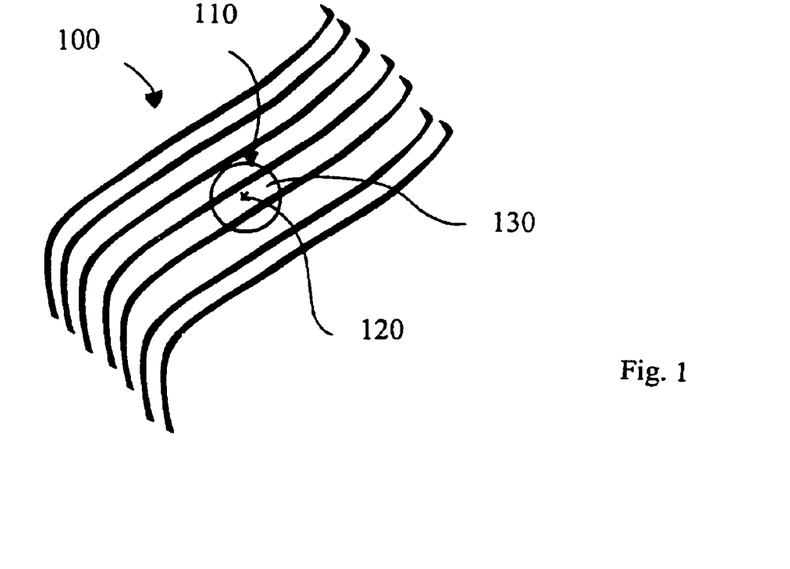
FIG. 1 shows a number of vector-based paths and a modification brush in accordance with the invention.
Figure 2A:
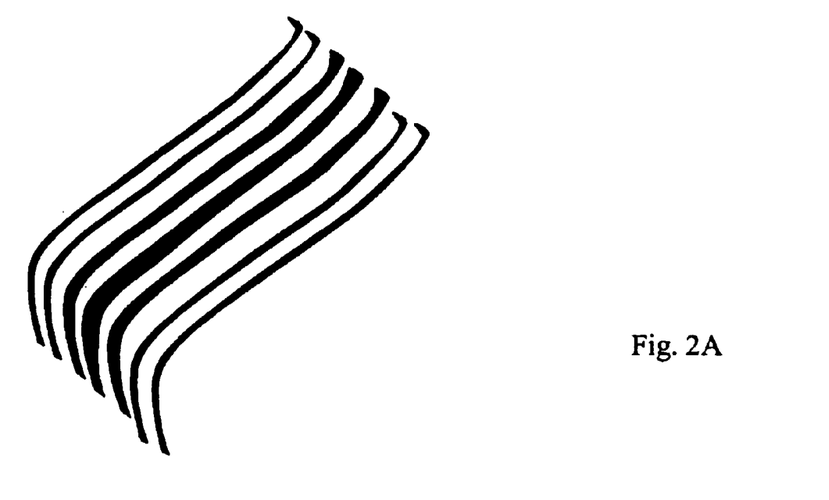
FIG. 2A shows the same paths as in FIG. 1, wherein the radius of the central paths has been globally modified by a user using a global radius modification brush in accordance with the invention.
Figure 2B:
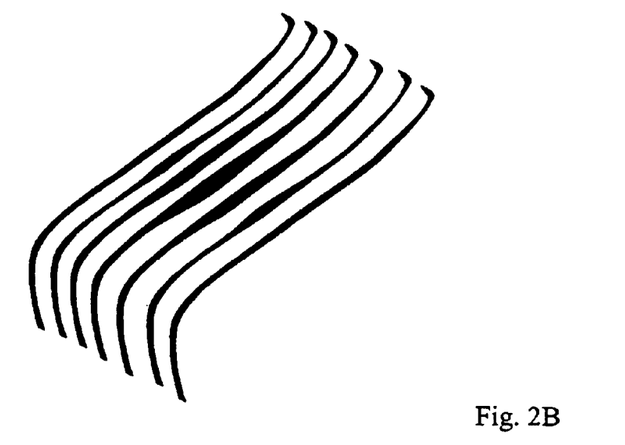
FIG. 2B shows the same paths as in FIG. 1, wherein the radius of the central paths has been locally modified by a user using a local radius modification brush in accordance with the invention.
Figure 2C:
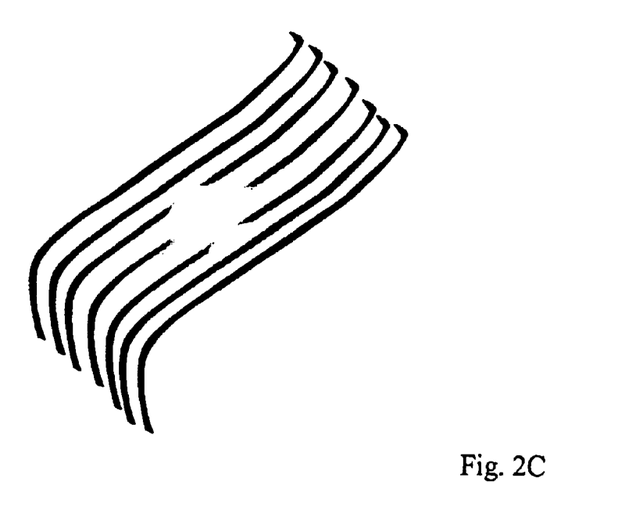
FIG. 2C shows the same paths as in FIG. 1, wherein the lightness of the central paths has been locally modified by a user using a local lightness modification brush in accordance with the invention.

FIG. 1 shows a set of vector-based paths 100 generated in a computer application. The paths 100 shown in FIG. 1 are in a two-dimensional space, but the invention is applicable to paths in any number of dimensions that are viewable by projection in a two-dimensional environment. Each path consists of at least two vertices (not shown) joined by path segments. The vertices are normally not visible to a user of the computer application. The path segments between the vertices can be described by a parametric vector curve. The parametric vector curve can be a curve described by a polynomial, such as a Bezier curve, for example. Each vertex has associated information about the location of the vertex and the shape of the path segment between the vertex and an adjacent vertex. Moreover, each vertex also has associated information about one or more stylistic properties of the path. A stylistic property is an appearance property in addition to the shape of the path, and examples of stylistic properties include the width (or radius) of the path, different color properties of a fill of the path (for example luminosity, hue, and saturation), and the opacity of a stroke of the path or of different patterns that may be "stamped" along the path. Each stylistic property can be represented by a polynomial along the path. More particularly, a cubic polynomial in most cases gives sufficient flexibility to enable moderately localized changes of a stylistic property along the path. The information for a stylistic property of a path can be stored as set of stylistic property values (polynomial coefficients) in a table or list together with the associated information for the vertices along the path (that is, the vertices locations and the coefficients for the polynomials describing the path segments between the vertices).

A path with stylistic properties can be drawn in several ways. For example, curves can be drawn offset on both sides from the path trajectory. The distance of the curves from the trajectory is approximately set to the desired radius for a given location along the path as parameterized by a parameter s which varies from 0 to 1 from one end of the path to the other. The region between the two offset curves is filled with a color. The color itself can be determined by a function of s that can vary along the path.

A second method of drawing a path with stylistic properties is to place artwork along the path. The artwork may be a raster image or may be vector artwork. Several aspects of the artwork may be treated as stylistic parameters. These include the size, scale, rotation angle, shear and other nonlinear distortions of the shape of the artwork. If two shapes describe the artwork and a morphing function is provided to interpolate between these shapes, then the parameters associated with this function can serve as stylistic parameters.

The internal details of the artwork may also be parameterized as stylistic parameters (for example, the color of all or a portion of the artwork). Parametric texture applied to the artwork can also be used as a stylistic parameter. Furthermore, the distribution of the artwork along the path can also serve as a stylistic parameter. The artwork may be placed randomly near the path and the characteristics of the random function (such as standard deviation in the x and y directions for a Gaussian random distribution) can be the stylistic parameters. The artwork may also be placed in an organized fashion along the path, and as long as that placement is a function of s, the placement can serve as a stylistic parameter.

Also shown in FIG. 1 is a modification brush 110. The modification brush 110 is represented on a display by a cursor 120 and has a region of influence 130. The modification brush 110 is a user interface tool that can be operated by a user to change a particular stylistic property of all the vector-based paths that fall within the region of influence. The modification brush can be controlled by a user with an input device, such as a computer mouse. The process of changing a stylistic property of a path using a modification brush will now be described with reference to FIGS. 2A–2C and 3.

Figure 3:
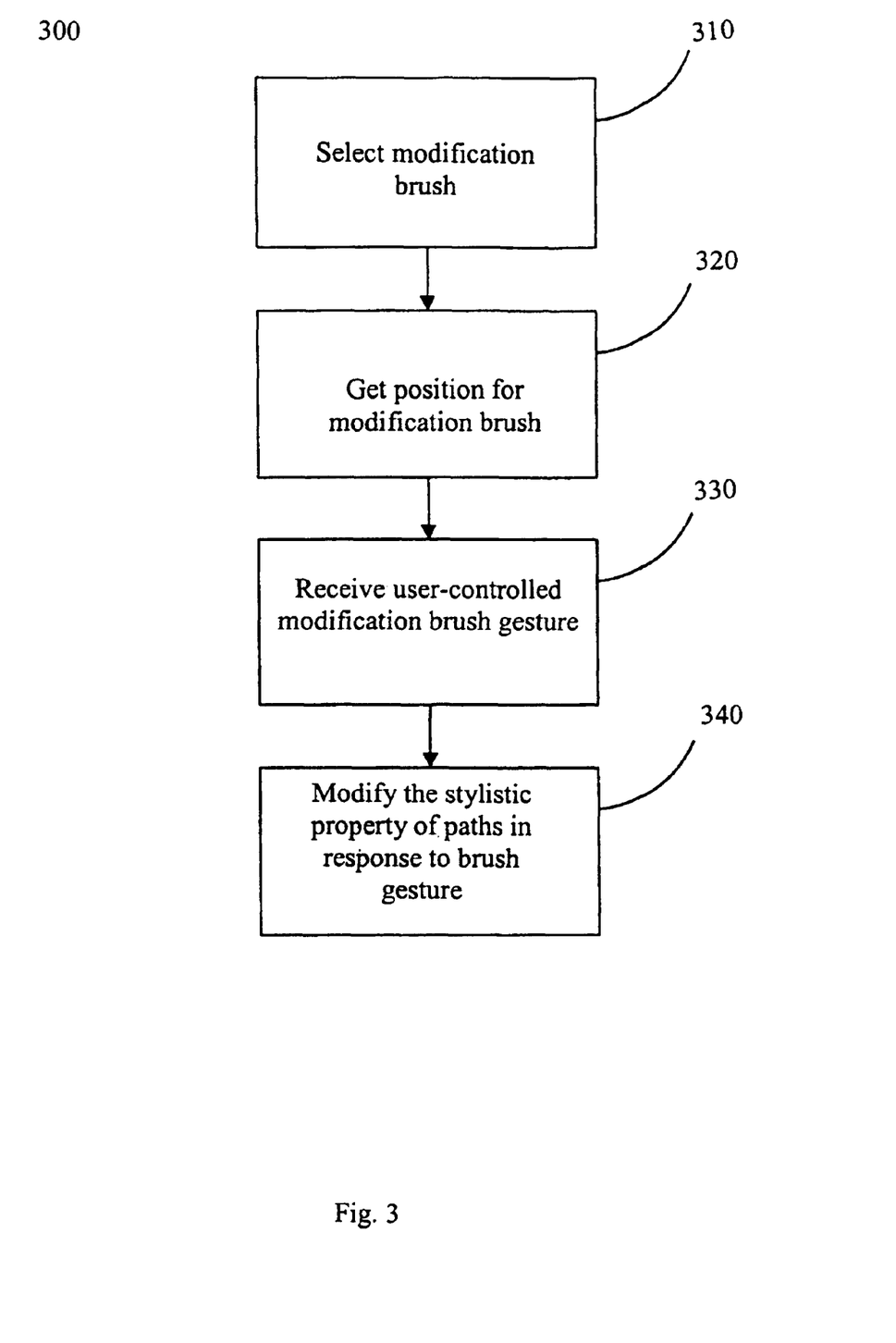
FIG. 3 is a flowchart of a procedure for locally modifying a vector-based path in accordance with the invention.

As shown in FIG. 3, a process 300 receives a user selection of a modification brush (step 310). The user can select from a number of modification brushes and, as mentioned above, each modification brush operates on a particular stylistic property of a vector-based path in an electronic document. The modification brush typically has a region of influence around the cursor. The region of influence may have varying size, shape, rotation and strength, and is shown in FIG. 1 as a circular region of influence having a radius that can be selected by the user. The region of influence also has an associated strength that indicates how much a given movement of the modification brush will affect the curves within the region of influence. The strength can be uniform across the whole region of influence, or it can be a function of the distance from the cursor so that paths closer to the center of the region of influence are more strongly affected by a given movement than paths located at the edge of the region of influence.

After the user has selected a modification brush, he or she places the selected modification brush at some position in the electronic document, and the process gets the position of the cursor associated with the modification brush (step 320). The process receives a user-controlled gesture of the modification brush (step 330). The modification brush can, for example, be moved by the user by moving the mouse while holding the mouse button pressed down. The movement of the modification brush can be an accumulative back-and-forward movement, or can be a one-way movement, and is considered to be a single movement as long as the mouse button is depressed or similar corresponding signal is generated.

In response to the received user-controlled gesture of the modification brush the process identifies the paths that pass within the region of influence of the brush during the user-controlled gesture and modifies the stylistic property of the paths within the region of influence of the modification brush (step 340). When the stylistic property is modified, the process first determines for each path which path segments pass within the region of influence of the modification brush. If the length of the path segments that pass within the region of influence of the modification brush are of approximately the same size as a cross section the region of influence of the modification brush, the stylistic property is modified in response to the user-controlled gesture, as will be described below. If the user has selected a small modification brush, such that the cross section of the region of influence of the modification brush is smaller than the length of the path segments that pass within the region of influence, then the process subdivides these path segments into smaller path segments. The process can perform this subdivision automatically without user interaction, so the only thing the user needs to do is to specify the size of the region of influence when selecting the modification brush.

In one implementation the division of the path segments is performed by the process in the following manner. For any given path segment that is determined to be too long, the process divides the segment into two segments of equal length by inserting a vertex at the center point of the path segment and giving the vertex corresponding x and y coordinates. Information about this vertex, such as the vertex location, the coefficients for the polynomial describing the surrounding path segments, and so on, is inserted into a list of existing vertices that define the path. If the path segments are represented by Bezier curves, a control point for the new vertex is also set so that the parametric derivative at the point for the new vertex remains unchanged. The process then checks if the new path segments still are too long, and if so, the process subdivides these path segments further until they have the desired size, set forth above.

When the path segments have been properly subdivided by the process, the stylistic property is changed. Normally the change in stylistic property of the paths is proportional to some measure of the vigor of the user-controlled gesture of the modification brush, such as the distance the modification brush is moved after the mouse button has been depressed. The change may apply to the whole path or be localized to the path segment that is closest to the modification brush. This can be controlled by associating decay strength with the modification brush. A low value of the decay strength may produce a modification that is uniform along the length of the path, while a high value of the decay strength may produce only a localized modification that is of approximately the same size as the region of influence for the selected brush.

The user also has the option of selecting a "brush sensitivity" by associating a "stiffness" with the brush. A greater stiffness produces a smaller change of the associated stylistic property values when the brush is moved a given distance and a more detailed change of the stylistic property can thereby be accomplished. For example, if the central paths shown in FIG. 1 are modified with a radius-changing brush having a very low decay strength, the resulting central paths will look something like the paths in FIG. 2A, that is, having a substantially uniform thickness, while if the central paths are modified with a radius-changing brush having a higher decay strength, the modified central paths will look like the central paths in FIG. 2B.

Step 340 in which the stylistic property is changed in response to the user-controlled brush gesture will now be described in greater detail. This modification step will be now described by way of example of a path that has a varying width or radius R(s) along a path, where s is a curve parameter along the path and s=0 at the first vertex and s=1 at the second vertex. Let the radius R(s) be modeled by the polynomial $$R(s) = R_0 \cdot (1-s) + R_1 s + k_0 s(1-s)^2 + k_1 s^2(1-s)$$

where
R(s) is the radius of the path at the point s ($0 \leq s \leq 1$)
$R_0$ is the radius of the path at the first vertex (s=0)
$R_1$ is the radius of the path at the second vertex (s=1)
$k_0$ is the curvature of the path at the first vertex (s=0)
$k_1$ is the curvature of the path at the second vertex (s=1)

In one implementation the parameters $R_0$ and $k_0$ are stored together with the corresponding path parameters and stylistic property parameters for the first vertex, and the parameters $R_1$ and $k_1$ are stored with the corresponding path parameters and stylistic property parameters for the second vertex. Assume that a user would like to increase the radius of the path at a point "s" between the two vertices. In one implementation the user can select a radius modification brush having a selectable radius-changing value $\delta R$. The radius changing value can, for example, be set to $\delta R = 0.3$, meaning that between "mouse down" and "mouse up" events, all paths or path segments that pass within the radius of influence of the radius modification brush will be modified with $\delta R = 0.3$. If the mouse is clicked down again, paths within the region of influence of the brush will get an additional change of $\delta R$. In another implementation $\delta R$ is a property of the brush gesture and can, for example, be proportional to the brush motion. The magnitude of $\delta R$ is set by $\delta R = c \cdot \delta R_m$ where $\delta R_m$ is the distance that the mouse is moved between a mouse down event and a mouse up event and c is a constant of proportionality. If the mouse movement distance is measured in image pixels, then a typical value for c is 1.0, so that the radius of the path grows or shrinks in size by exactly the amount by which the mouse moves between mouse up and mouse down events.

Furthermore, the desired change in radius, $\delta R$ can be chosen to be a decreasing function of distance of a path segment from the mouse coordinate. If $d_{min}$ represents the shortest distance between the mouse cursor center and the path segment encountered during the mouse motion, then $\delta R$ can be multiplied by the factor $e^{-d_{min}/d_0}$ do to weight closer path segments more heavily than farther path segments. The constant $d_0$ can be set to the brush radius of influence or a number proportional to the brush radius of influence.

The change, $\delta R$, input by the user, can be mathematically described as:

$$\delta R = dR(s') = dR_0 \cdot (1-s') + dR_1 s' + dk_0 s'(1-s')^2 dk_1 s'^2(1-s')$$

where
dR(s') is the change in radius of the path at the point s' ($0 \leq s' \leq 1$)
$dR_0$ is the change in radius of the path at the first vertex (s=0)
$dR_1$ is the change in radius of the path at the second vertex (s=1)
$dk_0$ is the change in curvature of the path at the first vertex (s=0)
$dk_1$ is the change in curvature of the path at the second vertex (s=1)

This equation can be rewritten as:

$$1 = \vec{a} \cdot \vec{v}$$

where $$\vec{v} = \left( \frac{dR_0}{\sqrt{c_0}} \frac{1}{\delta R}, \frac{dR_1}{\sqrt{c_1}} \frac{1}{\delta R}, \frac{dk_0}{\sqrt{c'_0}} \frac{1}{\delta R}, \frac{dk_1}{\sqrt{c'_1}} \frac{1}{\delta R} \right)$$

$$\vec{a} = \left( \sqrt{c_0}\,(1-s'),\ \sqrt{c_1}\,s',\ \sqrt{c'_0}\,s'(1-s')^2,\ \sqrt{c'_1}\,s'^2(1-s') \right)$$

and $c_0$, $c_1$, $c'_0$, $c'_1$ represent compliances that are associated with $dR_0$, $dR_1$, $dk_0$ and $dk_1$, respectively. The compliances can be regarded as properties of the brush and path interaction. In one implementation, the compliances are properties of the path and cannot be controlled by the brush. In another implementation, the compliances are properties of the brush and are applied to all paths in the same way. In yet another implementation, the compliances are blended, so they have one path component and one brush component. For example $c_0$ could be described as $$c_0 = a_b \cdot b_0 + a_p \cdot p_0$$

where
$a_b$ is a proportionality constant for the brush, $b_0$ is a compliance associated with the brush, $a_p$ is a proportionality constant for the path, $p_0$ is a compliance associated with the path, and $a_b+a_p=1$.

By solving the above equation so that the magnitude of $\vec{v}$ is minimized, that is by minimizing a deformation energy, the values of the parameters $dR_0$, $dR_1$, $dk_0$ and $dk_1$ can be found to be:

$$dR_0 = \frac{\delta R \cdot c_0(1-s')}{N}$$

$$dR_1 = \frac{\delta R \cdot c_1 s'}{N}$$

$$dk_0 = \frac{\delta R \cdot c'_0 s'(1-s')^2}{N}$$

$$dR_0 = \frac{\delta R \cdot c'_1 s'^2 (1-s')}{N}$$

where $$N = c_0(1-s')^2 + c_1 s'^2 + c'_0 s'^2(1-s')^4 + c'_1 s'^4(1-s')$$

The new polynomial describing the radius along the path can then be written as:

$$R(s) = (R_0+dR_0)(1-s) + (R_1+dR_1)s + (k_0+dk_0)s(1-s)^2 + (k_1+dk_1)^2)(1-s)$$

A useful enhancement to the above equations is to define the compliances as:

$$c_0 = e^{-gs}$$

$$c_1 = e^{-g(1-s)}$$

$$c'_0 = c'_1 = 1$$

By defining the compliances in this manner, the user only needs to control one "decay strength," g instead of setting all the compliances individually. Also, by choosing the compliances in this manner, the radius of the path can increase flexibly in the vicinity of a vertex when the brush cursor is moved close to the vertex, while leaving the vertex radius almost unchanged when the brush cursor is moved in between vertices. Typical values of the decay strength, g, are in the range of 0 to 100. Larger values produce more localized results.

The stylistic property that the process can change in response to a user input does not have to be a scalar property like the radius of the path. The property can be described with a vector, for example a color vector in an RGB color space. The mathematical operations outlined above will then be performed on a set of equations rather than on a single equation. For example, in the case of a color vector represented in an RGB space, the equation corresponding to the equation for the radius of the path above will be:

$$\vec{C}(s) = \vec{C}_0 \cdot (1-s) + \vec{C}_1 \cdot s + \vec{k}_0 \cdot s(1-s)^2 + \vec{k}_1 \cdot s^2(1-s)$$

where $\vec{C}(s)$ is the color vector of the path at the point s' ($0 \leq s' \leq 1$)

$\vec{C}_0$ is the color vector of the path at the first vertex (s=0)

$\vec{C}_1$ is the color vector of the path at the second vertex (s=1)

$\vec{k}_0$ is the color gradient vector of the path at the first vertex (s=0)

$\vec{k}_1$ is the color gradient vector of the path at the second vertex (s=1)

Each component of the color is described exactly as the radius of the path was described above, and the equations describing the change in color follow from the equations for the change in radius. Similarly, the equations for the radius that are parameterized by s and the radius change can be used to refer to any other stylistic property.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Another implementation of the invention is applicable to editing keyframes in a digital movie editing application, such as the Adobe AfterEffects® program. Paths in a first keyframe and in a second keyframe can be edited by a user using a modification brush in accordance with the invention. The change applied to the paths during the editing operation can then be automatically interpolated for intermediate frames, thus creating a simple and intuitive way of editing a digital movie. The concept of keyframes and automatic interpolation of path properties between keyframes has been described in U.S. Pat. No. 5,929,867 for Floating Keyframes, which is incorporated hereby by reference.

A number of implementations of the invention have been described. Nevertheless, it will be understood that various modifications may be made without departing from the spirit and scope of the invention. For example, each path can have an associated amplification factor for each stylistic property. When the modification brush is moved a given distance, two paths that lie within the region of influence may be differently affected. For example, if one path has an amplification of one and another path has an amplification factor of two, the stylistic property of the path having the amplification factor of two will be changed two times as much as the corresponding stylistic property of the path having the amplification factor of one. Another implementation of the invention includes modification brushes that can simultaneously affect more than one stylistic property, for example, increase the path radius while darkening the path colors. Accordingly, other embodiments are within the scope of the following claims.

What is claimed is:

1. A computer program product, stored on a machine-readable medium, comprising instructions operable to cause a computer to:
   display all or a portion of an electronic document and at least one brush tool to a user, the electronic document having paths defined by parametric vector curves, the brush tool being indicated by a cursor and having a region of influence;
   receive a user input selecting a brush tool and positioning the selected brush tool on the electronic document; and
   change a stylistic property of paths that pass within the region of influence of the selected brush tool in response to a continuous user-controlled gesture of the brush tool, the stylistic property being a vector-based appearance property that varies along a path.

2. The product of claim 1, wherein the region of influence is a changeable parameter of the brush tool.

3. The product of claim 2, wherein the size of the region of influence is changeable.

4. The product of claim 2, wherein the shape of the region of influence is changeable.

5. The product of claim 2, wherein the rotation of the region of influence is changeable.

6. The product of claim 2, wherein the strength of the region of influence is changeable.

7. The product of claim 1, wherein the parametric vector curves are curves in a two-dimensional space.

8. The product of claim 1, wherein the parametric vector curves are represented by polynomials.

9. The product of claim 1, wherein the parametric vector curves are Bezier curves.

10. The product of claim 1, wherein the stylistic property is changed by altering the vectors that represent the stylistic property.

11. The product of claim 1, wherein the change of the stylistic property is a localized change and only affect the parts of the paths that pass within the region of influence of the selected brush tool.

12. The product of claim 1, wherein the stylistic property of the path is changed by an amount that is proportional to the distance the selected brush tool is moved during the continuous user-controlled movement of the brush tool.

13. The product of claim 1, wherein the stylistic property is described by a polynomial and the components of the vectors associated with the stylistic property correspond to coefficients in the polynomial.

14. The product of claim 13, wherein the polynomial is a cubic polynomial.

15. The product of claim 13, wherein each polynomial coefficient has an associated stiffness coefficient.

16. The product of claim 1, wherein the stylistic property is a property unrelated to the shape of the path.

17. The product of claim 1, wherein the stylistic property is the width of the path.

18. The product of claim 1, wherein the stylistic property is the opacity of a stroke of the path.

19. The product of claim 1, wherein the stylistic property is a color property of a fill of the path.

20. The product of claim 19, wherein the color property is the luminosity of the fill of the path.

21. The product of claim 19, wherein the color property is the hue of the fill of the path.

22. The product of claim 19, wherein the color property is the saturation of the fill of the path.

23. The product of claim 1, wherein the stylistic property is instances of a pattern that are stamped along the path.

24. The product of claim 23, wherein changing a stylistic property comprises locally rotating one or more instances of the pattern.

25. The product of claim 23, wherein changing a stylistic property comprises locally translating one or more instances of the pattern.

26. The product of claim 23, wherein changing a stylistic property comprises locally scaling one or more instances of the pattern.

27. The product of claim 23, wherein changing a stylistic property comprises locally distorting one or more instances of the pattern.

28. The product of claim 1, wherein changing a stylistic property comprises changing a stylistic property only for the path in the electronic document that at any given moment passes closest to a center of the region of influence of the selected brush tool.

29. A computer-implemented method for locally modifying a stylistic property of at least one path in an electronic document, the method comprising:
   displaying all or a portion of an electronic document and at least one brush tool to a user, the electronic document having paths defined by parametric vector curves, the brush tool being indicated by a cursor and having a region of influence;
   receiving a user input selecting a brush tool and positioning the selected brush tool on the electronic document; and
   changing a stylistic property of paths that pass within the region of influence of the selected brush tool in response to a continuous user-controlled gesture of the brush tool, the stylistic property being a vector-based appearance property that varies along a path.

30. The method of claim 29, wherein the parametric vector curves are represented by polynomials.

31. The method of claim 29, wherein changing the stylistic property comprises altering the vectors that represent the stylistic property.

32. The method of claim 29, wherein the stylistic property is the width of the path.

33. The method of claim 29, wherein the stylistic property is the opacity of a stroke of the path.

34. The method of claim 29, wherein the stylistic property is a color property of a fill of the path.

35. A computer-implemented method for locally modifying a stylistic property of at least one path in an electronic document, the method comprising:
   displaying at least a part of the electronic document with the at least one path to a user, each path being defined by a parametric vector curve and having at least one stylistic property, the stylistic property being a vector-based appearance property that varies along the path;
   receiving user inputs selecting a location in the electronic document, a region of influence around the location, and a stylistic property to be modified;

modifying locally the selected stylistic property of paths that lie within the region of influence by altering the vectors associated with the stylistic property.

36. The method of claim 35, further comprising receiving a user input indicating the degree of localization and extent of the modification of the stylistic property.

37. The method of claim 35, wherein each path is delimited by two vertices.

38. The method of claim 37, further comprising:
adding one or more vertices to divide the path into smaller path segments, each path segment being defined by a smaller parametric vector curve and having at least one vector-based stylistic property;
modifying locally the stylistic property of path segments within the region of influence by altering the vectors associated with the stylistic property.

39. The method of claim 35, wherein the step of locally modifying the selected stylistic property includes modifying the selected stylistic property based on an amplification factor associated with the path.

40. A computer program product, stored on a machine-readable medium, comprising instructions operable to cause a computer to:
display at least a part of the electronic document with the at least one path to a user, each path being defined by a parametric vector curve and having at least one stylistic property, the stylistic property being a vector-based appearance property that varies along the path;
receive user inputs selecting a location in the electronic document, a region of influence around the location, and a stylistic property to be modified;
modify locally the selected stylistic property of paths that lie within the region of influence by altering the vectors associated with the stylistic property.

41. The product of claim 40, further comprising instructions operable to cause a computer to receive a user input indicating the degree of localization and extent of the modification of the stylistic property.

42. The product of claim 40, wherein each path is delimited by two vertices.

43. The product of claim 42, further comprising instructions operable to cause a computer to:
add one or more vertices to divide the path into smaller path segments, each path segment being defined by a smaller parametric vector curve and having at least one vector-based stylistic property;
modify locally the stylistic property of path segments within the region of influence by altering the vectors associated with the stylistic property.

44. The product of claim 40, wherein the step of locally modifying the selected stylistic property includes modifying the selected stylistic property based on an amplification factor associated with the path.

45. A computer program product, stored on a machine-readable medium, comprising instructions operable to cause a computer to:
display all or a portion of an electronic document and at least one brush tool to a user, the electronic document having paths defined by polynomials, the brush tool being indicated by a cursor and having a region of influence;
receive a user input selecting a brush tool and positioning the selected brush tool on the electronic document; and
alter vectors that are associated with at least one path that passes within the region of influence of the selected brush tool in response to a user-controlled gesture of the brush tool, the vectors representing a width of the at least one path that varies along the at least one path.

46. A computer program product, stored on a machine-readable medium, comprising instructions operable to cause a computer to:
display all or a portion of an electronic document and at least one brush tool to a user, the electronic document having paths defined by parametric vector curves, the brush tool being indicated by a cursor and having a region of influence;
receive a user input selecting a brush tool and positioning the selected brush tool on the electronic document; and
change locally an appearance property for parts of the paths that pass within the region of influence of the selected brush tool in response to the distance that the brush tool is moved during a continuous user-controlled gesture, the appearance property being a vector-based property that is unrelated to the shape of a path and varies along the path.

47. The product of claim 46, wherein the appearance property is the width of the path.

48. The product of claim 46, wherein the appearance property is the opacity of a stroke of the path.

49. The product of claim 46, wherein the appearance property is a color property of a fill of the path.

50. A method for editing a digital movie, the digital movie comprising a first keyframe, a second keyframe, and intermediate frames, the method comprising:
displaying the first keyframe and at least one brush tool to a user, the first keyframe having paths defined by a parametric vector curves, the brush tool being indicated by a cursor and having a region of influence;
receiving a first user input selecting a brush tool and using the brush tool to change a stylistic property of paths in the first keyframe that pass within the region of influence of the selected brush tool, the stylistic property being a vector-based appearance property that varies along a path;
displaying the second keyframe and the selected brush tool to the user, the second keyframe having paths defined by parametric vector curves corresponding to the paths in the first keyframe;
receiving a second user input using the selected brush tool to change the stylistic property of paths in the second keyframe that pass within the region of influence of the selected brush tool; and
automatically interpolating a change of the stylistic property for paths in intermediate keyframes corresponding to the changed paths in the first and second keyframes.

* * * * *